(12) United States Patent
Shukla et al.

(10) Patent No.: US 8,402,158 B2
(45) Date of Patent: *Mar. 19, 2013

(54) ADAPTIVE VARIABLE FIDELITY MEDIA DISTRIBUTION SYSTEM AND METHOD

(75) Inventors: Amol Shukla, Seattle, WA (US); Aaron James Colwell, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,217

(22) Filed: Apr. 17, 2012

(65) Prior Publication Data

US 2012/0203923 A1    Aug. 9, 2012

Related U.S. Application Data

(60) Continuation of application No. 13/092,853, filed on Apr. 22, 2011, now Pat. No. 8,171,153, which is a division of application No. 12/181,310, filed on Jul. 28, 2008, now Pat. No. 7,953,882.

(60) Provisional application No. 60/952,031, filed on Jul. 26, 2007.

(51) Int. Cl.
  *G06F 15/173* (2006.01)
(52) U.S. Cl. .................................................... 709/231
(58) Field of Classification Search .................. 709/231, 709/217, 230
See application file for complete search history.

(56) References Cited

U.S. PATENT DOCUMENTS

| | | | |
|---|---|---|---|
| 6,333,750 B1 * | 12/2001 | Odryna et al. | 345/629 |
| 6,453,361 B1 * | 9/2002 | Morris | 709/250 |
| 6,999,432 B2 * | 2/2006 | Zhang et al. | 370/328 |
| 7,116,717 B1 * | 10/2006 | Eshet et al. | 375/240.25 |
| 7,310,336 B2 * | 12/2007 | Malkamaki | 370/392 |
| 7,310,480 B2 * | 12/2007 | Maciocco et al. | 398/48 |
| 7,328,030 B2 * | 2/2008 | Laursen et al. | 455/466 |
| 7,486,658 B2 * | 2/2009 | Kumar | 370/350 |
| 7,555,540 B2 * | 6/2009 | Dunbar et al. | 709/220 |
| 7,715,389 B2 * | 5/2010 | Pichna et al. | 370/390 |
| 7,721,186 B2 * | 5/2010 | Bates et al. | 714/784 |
| 7,962,639 B2 * | 6/2011 | Dunbar et al. | 709/231 |

* cited by examiner

*Primary Examiner* — David Eng
(74) *Attorney, Agent, or Firm* — Æ ON Law; Adam L. K. Philipp

(57) ABSTRACT

A layered media stream comprising media information layers of different priorities may be adaptively distributed by transmitting at least one of the media information layers to a client on a time-windowed basis. A client device obtains different media information layers during various time windows, and different portions of the media stream may be rendered using different combinations of layers obtained in each time window. In various embodiments, different layers may be obtained from different hosting devices using differing distribution models.

12 Claims, 15 Drawing Sheets

ADAPTIVE VARIABLE FIDELITY MEDIA DISTRIBUTION SYSTEM AND METHOD

CROSS-REFERENCE TO RELATED APPLICATIONS

The present application is a continuation of U.S. patent application Ser. No. 13/092,853 (now U.S. Pat. No. 8,171, 153), titled "ADAPTIVE VARIABLE FIDELITY MEDIA DISTRIBUTION SYSTEM AND METHOD", filed Apr. 22, 2011, and naming inventors Amol Shukla and Aaron James Colwell. U.S. patent application Ser. No. 13/092,853 is a divisional application of U.S. patent application Ser. No. 12/181,310 (now U.S. Pat. No. 7,953,882), titled "ADAPTIVE VARIABLE FIDELITY MEDIA DISTRIBUTION SYSTEM AND METHOD," filed Jul. 28, 2008, and naming inventors Amol Shukla and Aaron James Colwell. U.S. patent application Ser. No. 12/181,310 claims priority from U.S. provisional patent application No. 60/952,031, titled "VARIABLE FIDELITY MEDIA PROVISION SYSTEM AND METHOD," filed Jul. 26, 2007, and naming inventors Amol Shukla and Aaron James Colwell. The above-cited applications are hereby incorporated by reference in their entireties for all purposes.

FIELD

This invention relates generally to adaptive variable fidelity digital information, and more specifically, to systems and methods for providing variable fidelity layered media that adapts as network and/or terminal conditions change.

BACKGROUND

The number of devices capable of playing media is growing at a staggering rate. Virtually all modern personal computers and many modern cell phones, personal digital assistants, personal media players, set-top boxes, game consoles, and even refrigerators are capable of media playback. Such disparate devices can differ widely in their memory and processing capabilities, screen sizes, power consumption restraints, and available communications bandwidth. Such devices may receive media for playback via any number of communications technologies, including cable and DSL, fiber to the home, Wi-Fi, BlueTooth, 2.5G and 3G mobile phone networks, and the like.

Now that consumers have so many different connected media playback devices, many wish to be able to access all of their content at any time, from anywhere. But at the same time, few consumers wish to educate themselves about the technical details of their communications interfaces or device constraints.

Similarly, few content providers wish to or are able to encode, store, and select from multiple versions of each piece of media to provide a version appropriate to provide to a particular client device. This approach is burdensome in part because it is often difficult for a content provider to ascertain the playback capabilities of any particular playback device, yet in most cases, the consumer is also unwilling or unable to ascertain and provide such information.

Another approach to the problem has been to encode each piece of media into multiple independent streams at varying bitrates, then switch between those streams to address varying bandwidth capacities. Technologies such as SureStream, developed by Real-Networks, Inc. of Seattle Wash., take such an approach, monitoring delivery rates and attempting to predict which bitrate stream to deliver as network capacity varies over time. Still, this approach is complex to implement and addresses only the bandwidth dimension of the differences between playback clients.

A better solution may be to utilize variable-fidelity media, encoding each piece of media a single time into a base layer and a set of additive layers that enhance the quality, size, or other attributes of the base layer.

The concept of variable fidelity, scalable, or layered media is well known in the art. According to this concept, a piece of media or a presentation comprising multiple pieces of media is split up into a set of layers, each layer containing information that builds on top of one or more of the layers below it.

Layered media or layered presentations have become commonplace in certain contexts, while remaining obscure in others. One simple example of a commonly encountered form of layering is a web page that may comprise a base layer (e.g., basic text and html layout information) and one or more enhancement layers, for example a CSS style sheet layer, a scripting layer, and/or one or more media layers (e.g., individual image files). A client device may choose to display some or all of these layers, depending on the capabilities of the client and/or network conditions. For example, a mobile phone browser may obtain and display only the base text layer, whereas a desktop computer web browser may obtain and display all layers. For another example, a client device may disable bandwidth-heavy media layers when using a slow network connection.

Many audio and video compression/decompression ("codec") specifications include support for scalable or layered modes, although few scalable modes are in common usage. For example, the MPEG-2 standard defines several profiles that include support for signal-to-noise ratio ("SNR") and/or spatial scalable modes. For another example, the H.264 standard with the Scalable Video Coding extension defines profiles that provide for temporal, spatial, and SNR scalability. These three types of scalability have the following general characteristics:

Temporal scalability: media is coded at multiple frame rates (video) or sampling rates (audio). For example, a base layer may provide video encoded at 7.5 frames per second (FPS) video, while enhancement layers can be added to improve the frame rate to 15 FPS and 30 FPS.

Spatial scalability: video is coded at multiple spatial resolutions. For example, a base layer may provide video encoded at a resolution of 320×240, while multiple enhancement layers may increase the resolution to 640× 480 and 800×600.

SNR scalability: media is coded at multiple degrees of fidelity or clarity. For example, a base layer may provide audio encoded at 8 bits per sample, while enhancement layers increase the bit depth to 16 and 24 bits per sample.

In the audio/video context, the promise of layered media codecs has remained largely unrealized. Disclosed are methods and systems which use layered media to improve the distribution of media using client-server, peer-to-peer ("P2P") and/or hybrid (mixed client-server and P2P) models.

BRIEF DESCRIPTION OF THE DRAWINGS

The present invention will be described by way of exemplary embodiments but not limitations, illustrated in the accompanying drawings in which like references denote similar elements, and in which.

DESCRIPTION

Figure 1:
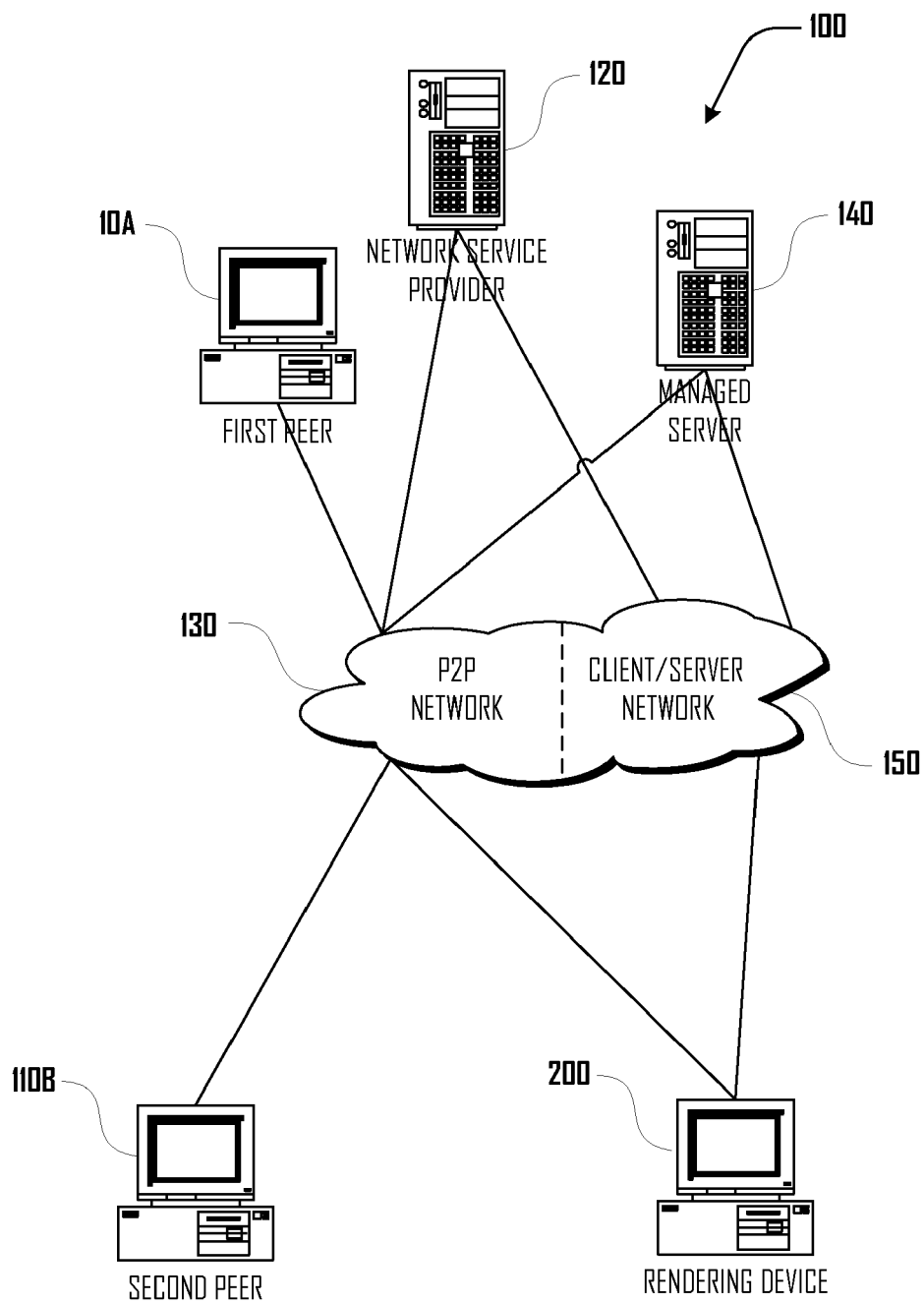
FIG. 1 is a pictorial diagram of a system of interconnected devices that provide variable fidelity media in accordance with various embodiments.

Illustrative embodiments of the present invention include, but are not limited to, systems and methods providing variable fidelity media over a P2P network and/or a client-server network.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the present invention; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

Layered media streams may be distributed according to several different schemes, including via a traditional client-server model, via a distributed managed server, via a traditional P2P network, and/or via a "hybrid" client/server/P2P network, which utilizes a managed server or a distributed managed server in conjunction with a P2P network. A distributed managed server is characterized in that the "server" may be provided by a distributed network of secure and often clustered distribution peers, similar to the networks operated by Google, Akamai, Amazon, and the like. A distributed server system is in some ways similar to a P2P network, though membership as a distribution peer is centrally controlled, data replication may be more formally controlled, and the peers may utilize an inwardly facing private network and an outwardly facing proxy (including a distributed proxy network) so as to appear as one logical server. References herein to "server" and "managed server" should be understood to include a distributed managed server unless the context indicates otherwise.

P2P network models could potentially be utilized by high-bandwidth content providers to minimize bandwidth costs and/or to provide "overflow" capacity for periods of peak usage of popular files. Bandwidth costs can be minimized because centrally managed servers need serve only a handful of clients, each of which in turn propagates the stream to more downstream clients. However, while the potential benefits of a P2P network model for content providers is relatively clear, it is less clear that consumers will be willing to participate in such networks because P2P file distribution essentially shifts some or all of the bandwidth costs from the distributor or content provider to the individual consumer, who must use at least some of his or her "upstream" bandwidth to provide information to other peers on the network. In other words, P2P network models impose a "cost" on the consumer in that the consumer must share a portion of his or her network bandwidth to upload data to other peers on the P2P network. By contrast, a consumer obtaining content from a client-server network model need not share any bandwidth with other peers.

In accordance with one embodiment, a layered media stream may be distributed via a managed server and a peer-to-peer (P2P) network and/or via a traditional client-server network. At least one base layer typically provides a lower-quality media stream, while one or more enhancement layers provide improvements to the media stream. In an alternative embodiment, a low-quality media stream (one adapted for display on a portable or other device with limited display) may be an enhanced layer in relation to one or more base layers of higher quality. A managed server may provide a base layer to clients in a traditional client-server network model and/or through the P2P network (either by acting as a distribution peer or by seeding to a distribution peer). The managed server may also provide enhancement layers through the P2P network (again, either by acting as a distribution peer or by seeding a distribution peer). The availability of the enhancement layers may provide clients with an incentive to participate in the P2P network and share in the distribution and storage costs for the enhancement layers.

One or more conditions may be placed on the distribution of a base and/or enhancement layer, including requiring that the requesting device participate in the P2P network as a distribution peer, that the requesting device maintains a distribution peer, and/or that the requesting device has paid for access.

In accordance with an alternate embodiment, a variable load of distributing a layered media stream may be balanced via a managed server and a peer-to-peer (P2P) network. A base layer typically provides a lower-quality media stream and may be rendered independent of other layers, while enhancement layers provide improvements to the media stream; certain layers may be both base layers and enhancement layers relative to another base layer. When demand for the media stream is low, the managed server may provide all layers to clients in a traditional client-server network model. When demand for the media stream is high, or as a general practice, the managed server may provide only the base layer, making enhancement layers available via the P2P network.

FIG. 1 illustrates an exemplary embodiment of a number of devices used in an exemplary system 100. The system 100 includes a first peer 110A, and a second peer 110B, which each participate in a P2P network 130. Additionally the system includes a managed server 140, which may act not only as a server on a client/server network 150, but also as a peer and/or distribution peer on the P2P network 130. A rendering device 200, may act as a client on the client/server network 150 and as a peer on the P2P network 130. As discussed further, for example, in relation to FIG. 6, peers in the P2P network 130 may act as distribution peers.

In various embodiments, there can be a plurality of peer devices 110A-B, P2P networks 130, managed servers 140, networks 150, and/or rendering devices 200. Moreover, one or more of these devices or networks can be absent in various embodiments.

In one exemplary embodiment, the first and second peer devices 110A-B, the managed server 140, and rendering device 200 can store media, which may be shared with peers participating in the P2P network 130 and/or with clients on the network 150. For example, rendering device 200 can query the P2P network 130 (or the managed server 140) and compile a list of available media that is stored on the devices or servers participating in the P2P network 130, and then select desired media to download from one or more device or server that store the selected desired media.

In another exemplary embodiment, the first and second peer device 110A-B, the managed server 140, and rendering device 200 can store layered media or layers of layered media, which can be shared with other peers participating in the P2P network 130 or to clients on the client/server network 150.

In one embodiment, a network service provider 120, or other intermediary such as a DNS server, a proxy server, a P2P indexing server or a seeding server, a special-purpose packet sniffer, or another network service component performs certain functions, such as measuring demand on the managed server 140 and network conditions, and may also, either acting on its own or under the direction of the managed server 140, direct requests from the managed server 140 to rendering devices 200 and/or peers 110.

In various embodiments, managed server 140 may act as a P2P indexing server (i.e., a "tracker"). Indexing servers typically provide centralized services such as content and peer indexing. As such, they may serve as a repository for control information in the network. They can optionally collect accounting and playback information from the peers. In various embodiments, managed server 140 may also act as a managed seed on a P2P network. Such a managed seed may not only introduce new content into the network, but may also continue uploading and supporting a subset of peer requests in order to meet quality of service requirements (e.g., target delivery rate). Additionally, managed seeds may help ensure steady content availability and help minimize startup and switch latencies. Techniques such as seed masquerading may be used in conjunction with upload incentives to encourage clients to download from other peers instead of the managed seeds.

Figure 2:
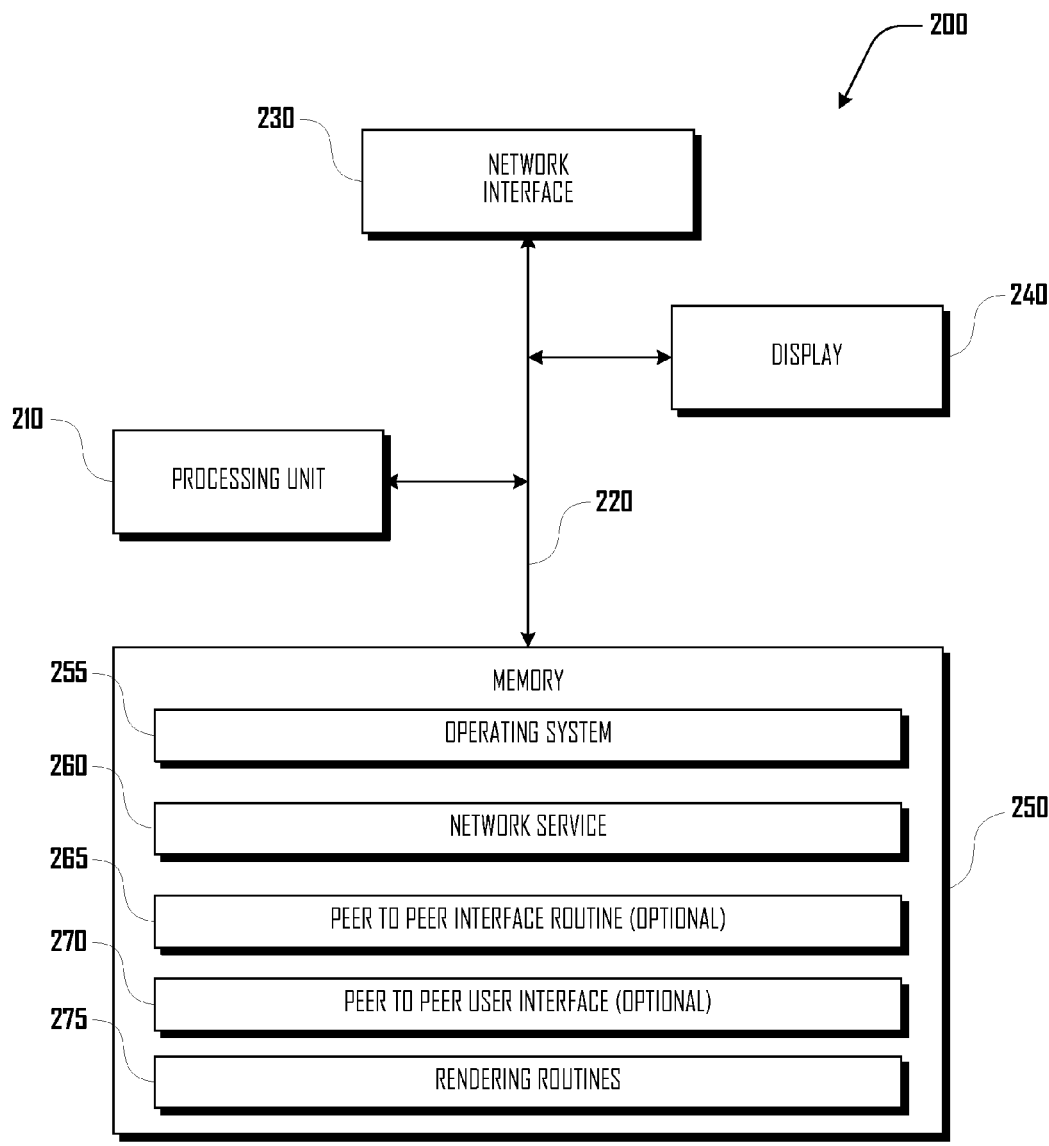
FIG. 2 is a block diagram of a peer device that provides an exemplary operating environment in accordance with various embodiments.

FIG. 2 illustrates several components of a rendering device 200. In various embodiments, the rendering device 200 may include more components than those shown in FIG. 2. However, it is not necessary that all of these generally conventional components be shown in order to disclose an enabling embodiment. As shown in FIG. 2, the rendering device 200 includes a network interface 230 for connecting to remote devices (not shown). The network interface 230 may be a network interface designed to support a local area network (LAN), wireless local area network (WLAN), personal area network (PAN), telephone network, powerline connection, serial bus, universal serial bus (USB) wireless connection, or the like. The network interface 230 includes the necessary circuitry, driver and/or transceiver for such a connection and is constructed for use with the appropriate protocols for such a connection.

The rendering device 200 also includes a processing unit 210, an optional display 240 and a memory 250, all interconnected along with the network interface 230 via a bus 220. In various embodiments, the display 240 may not be necessary in all forms of computing devices and, accordingly, is an optional component. The memory 250 generally comprises random access memory ("RAM"), a read only memory ("ROM") and a permanent mass storage device, such as a disk drive, flash RAM, or the like. In various embodiments, the memory 250 may store the program code necessary for a P2P interface routine 265 and a P2P user interface 270. Additionally, the memory 250 stores an operating system 255 and a network service 260.

In various embodiments, the software components may be loaded from a computer readable medium into memory 250 of the rendering device 200 using a drive mechanism (not shown) or network mechanism (not shown) associated with the computer readable medium, such as a floppy, tape, DVD/CD-ROM drive, flash RAM, or network interface card.

Although an exemplary rendering device 200 has been described that generally conforms to conventional general-purpose computing device, in various embodiments, a rendering device 200 may be any of a great number of devices capable of rendering media information. For example, a rendering device 200 may be a mobile phone, personal digital assistant, set-top box, game console, portable media player, personal computer, or the like.

In one exemplary embodiment, the P2P user interface 270, if present, is a graphical user interface. An example of a graphical user interface is an interactive web page, e.g., in HTML (HyperText Markup Language), Flash, JavaScript, VBScript, JScript, PHP (HTML Preprocessor), XHTML (eXtensible HyperText Markup Language) form, or the like. Resultantly, since users are generally familiar with the user interfaces of web pages, including sophisticated web pages such as Flash-enabled web pages from Adobe, of San Jose, Calif., consumption of P2P device services using a web page based graphical user interface on a rendering device 200 (e.g., displayed on the display 240) may be made familiar and user friendly. In an alternate embodiment, the P2P user interface 270, if present, may be a part of a stand-alone media player application or other rendering routines 275.

Figure 3:
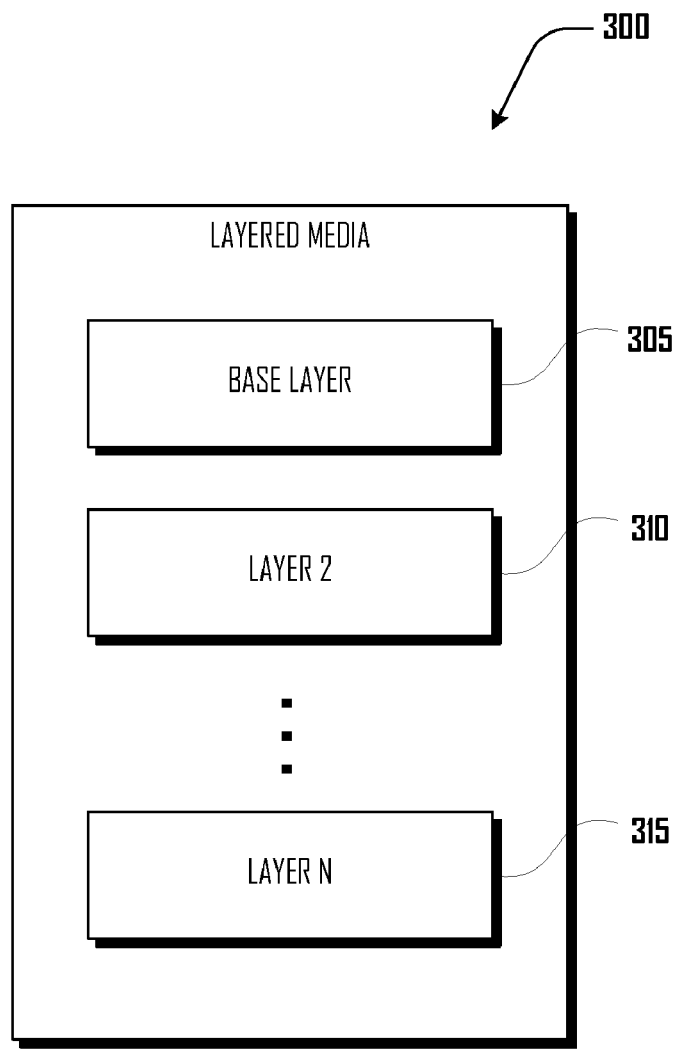
FIG. 3 is a diagram illustrating a layered media stream in accordance with various embodiments.

As illustrated in FIG. 3, layered media 300 can comprise a plurality of fidelity levels, including a base layer 305, a secondary layer 310, and zero or more additional layers 315. A piece of layered media 300 can be stored as a set of distinct files, each corresponding to a particular layer, as a single file encapsulating all layers, or as some combination of these two extremes. A base layer typically provides a low-quality media stream by itself. Often a base layer 305 standing alone provides a valid, typically low quality, bitstream for a decoder. But a base layer 305 may also require the presence of at least one additional layer 310-15 to be a valid bitstream. Moreover, a base layer may exhibit an adaptive window length, wherein the length of a base layer may change during the transmission of a media streaming event. In other embodiments, there may be multiple independent base layers.

Subsequent layers 310-15 typically provides additional temporal, spatial, or "quality" information which, when combined with the base layer, provides higher fidelity or more accurate reproduction of the originally encoded information. Standing alone, such "enhancement" layers do not generally provide a valid bitstream for a decoder. However, in one embodiment, an enhancement layer may provide a valid bitstream in and of itself, potentially with lower fidelity relative to the layer's base layer.

Taking the example of video media, the base layer 305 may provide basic video at low resolution and subsequent layers 310-15 may provide enhancements to the video, such as added audio, increased resolution, or increased video quality obtained from increased bit-depth and/or improved signal-to-noise ratio. Additional layers may also provide an improved encoding format or may increase the frame-rate of the video. Similarly, an additional layer for an audio file may provide higher quality by increase the sampling rate, the bit-depth, the encoding format, and the like.

It will be apparent to those skilled in the art that the concept of layered media can be applied to any media with variable fidelity, including, but not limited to video, audio, images, text, stock quotes, webpage display and content, e-mail, ringtones, or the like. Additionally, it will be apparent to those skilled in the art that all types of media and variable fidelity media are within the scope and spirit of various embodiments, including, but not limited to media with layered coding (or scalable coding), multiple description coding, hybrid layered and multiple description coding, or the like.

Figure 4:
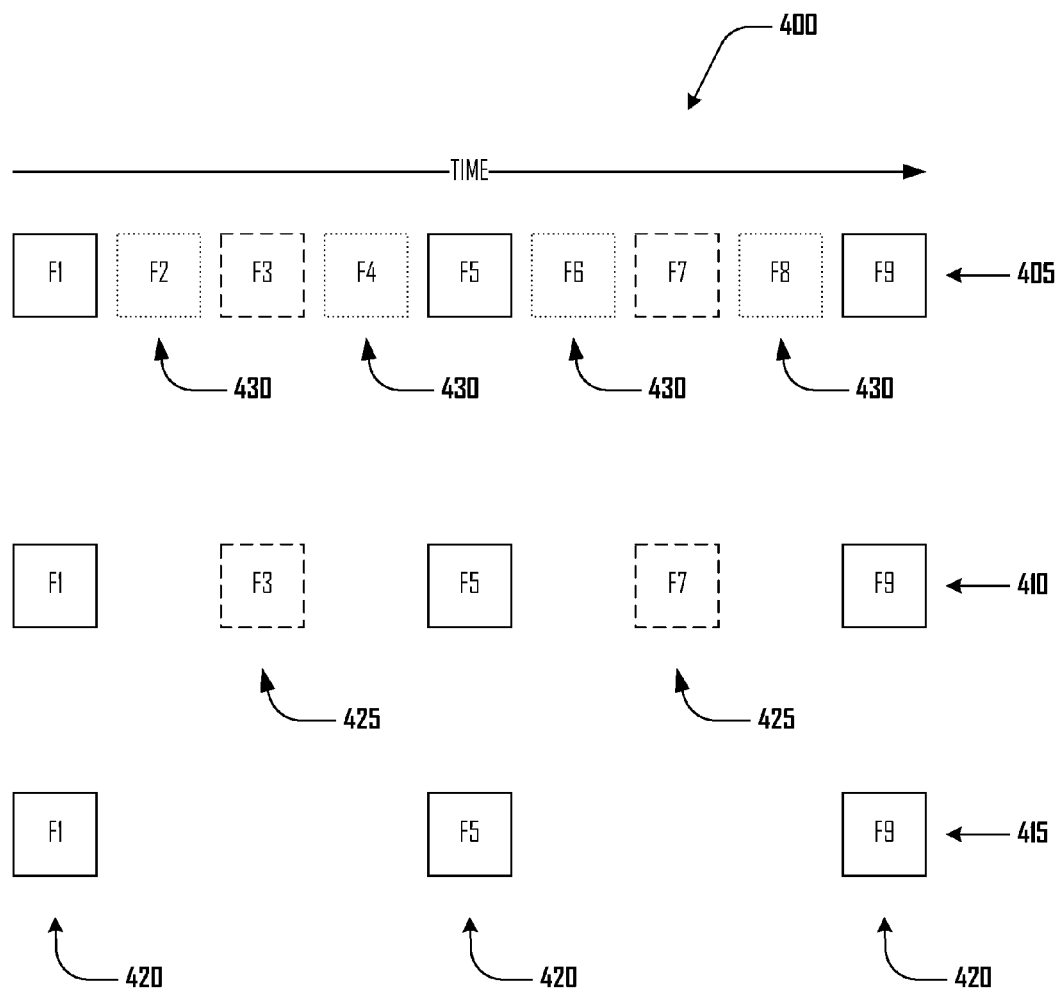
FIG. 4 is a pictorial diagram illustrating enhancement layers providing increased temporal resolution in accordance with various embodiments.

As illustrated in FIG. 4, the temporal resolution (e.g., frame rate or sample rate) may be enhanced by enhancement layers. As illustrated, the original source material was video at 30 frames per second ("fps"). The base layer 420 includes every fourth frame, and can be viewed on its own at 7.5 fps 415. A secondary layer 425 includes some of the frames missing from the base layer 420. The secondary layer 425 may be combined with the base layer 420 and viewed at 15 fps 410. The tertiary layer 430 may be combined with the base layer 420 and secondary layer 425, and viewed at 30 fps 405. In alternate embodiments, the illustrated technique can be adapted to other implementations beyond the example illustrated in FIG. 4.

Figure 5:
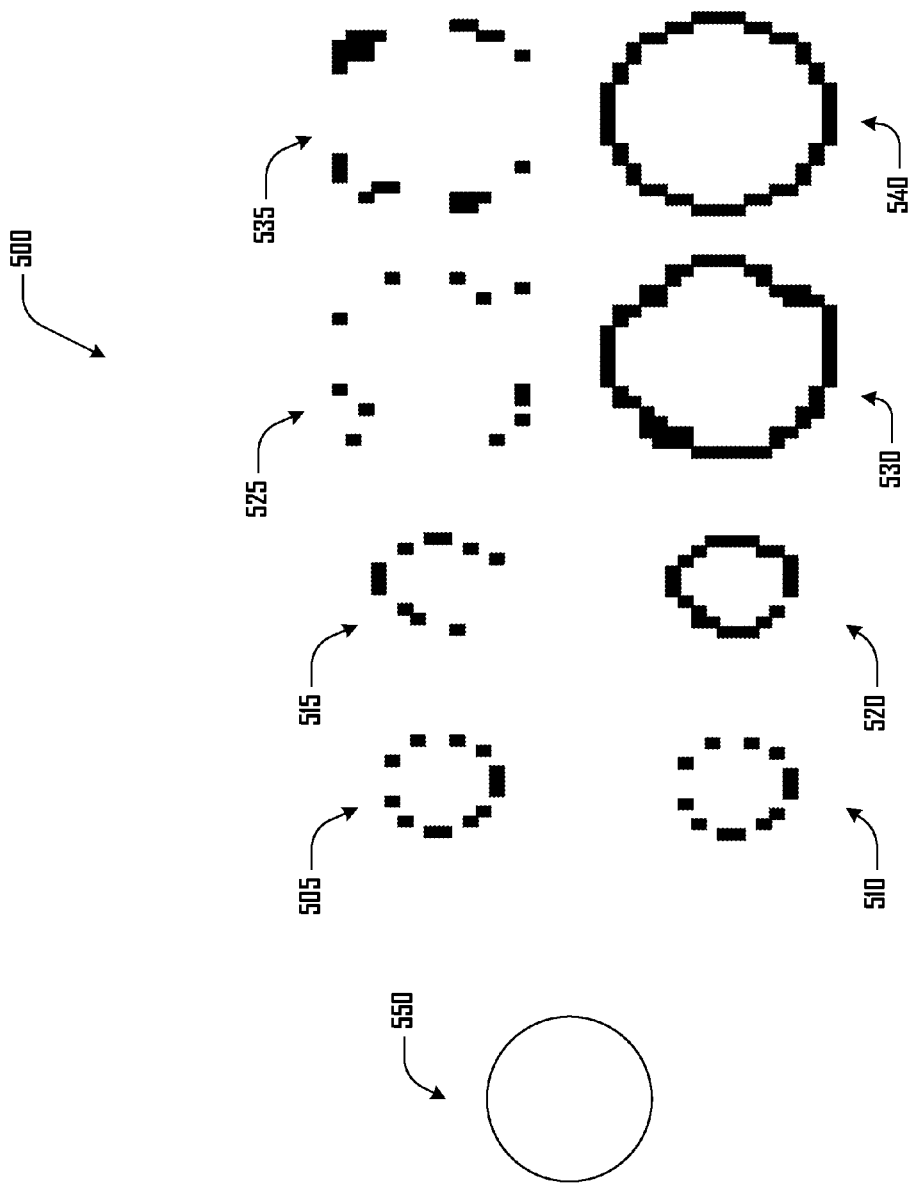
FIG. 5 is a pictorial diagram illustrating enhancement layers providing increased signal-to-noise ratio in accordance with various embodiments.

As illustrated in FIG. 5, the spatial resolution of an image may be enhanced by enhancement layers. The enhancement illustrated in FIG. 5 may also be characterized as improved signal-to-noise ratio. As illustrated, the original source image was a circle 550. The base layer 505 provides a set of data that can be rendered to an approximation 510 of the circle 550. A second layer 515 can be combined with the base layer 505 to render an image 520 that more closely approximates the original circle 550. In turn, a third layer 525 can be combined with the base layer 505 and second layer 515 to render an image 530 that even more closely approximates the original circle 550. Finally, a fourth layer 535 can be combined with the lower priority layers 505, 515, 525 to render an image that 540 that closely approximates the original circle 550. In alternate embodiments, the illustrated technique can be adapted to other implementations beyond the example illustrated in FIG. 5.

Figure 6:
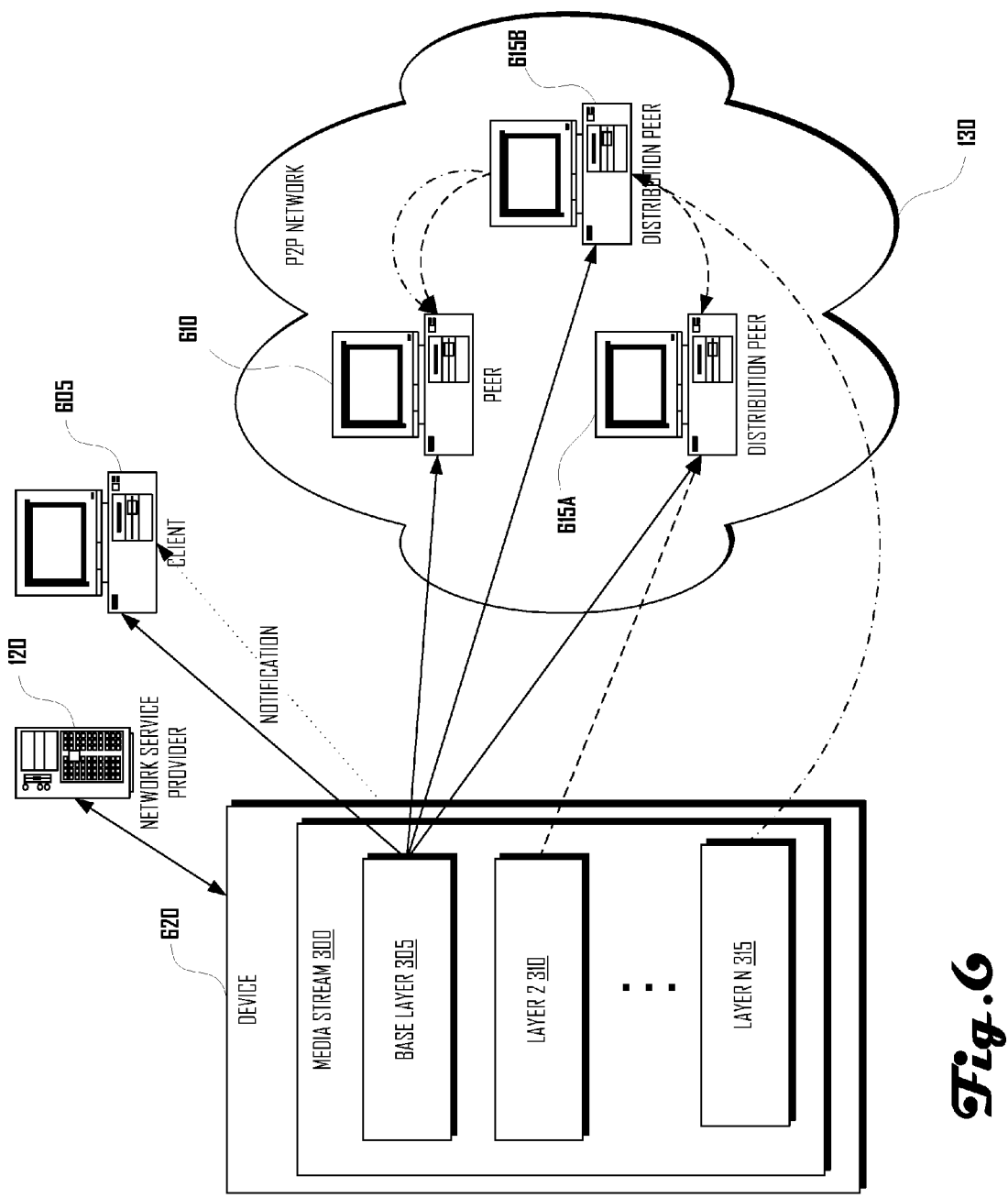
FIG. 6 is a pictorial diagram of a media stream being provided by a hosting device in accordance with various embodiments.

FIG. 6 illustrates one exemplary embodiment, wherein a layered media stream 300 is distributed via a hosting device 620 and a P2P network 130. The layered media stream 300 is hosted on a hosting device 620. Hosting device may be a managed server, a distribution peer, or other device that hosts and distributes layered media files. The hosting device 620 distributes the base layer 305 to requesting devices, including one or more peers 610, 615 that participate in a P2P network 130, and including one or more clients 605 (which do not participate in the P2P network 130). Thus, the base layer is distributed by the hosting device 620 to requesting devices without regard for their level of participation in the P2P network 130. The hosting device 620 also distributes one or more additional layers 310-15, but only, for example, to requesting devices that participate in the P2P network 130 as distribution peers 615A-B. A distribution peer 615 is a device (e.g., rendering device 200, peer device 110, or the like) that fully participates in the P2P network 130, not only receiving files and/or layers from other distribution peers 615, but also making files and/or layers available to other peers 610-15 on the P2P network 130. In contrast to a distribution peer 615, a non-distribution peer 610 only partially participates in the P2P network 130, receiving files and/or layers from distribution peers 615, but not making files and/or layers available to other peers in the P2P network 130.

For example, the hosting device 620 may distribute Layer 2 310 to a first distribution peer 615a. The first distribution peer 615a may then re-distribute Layer 2 310 to a second distribution peer 615b, which may further distribute Layer 2 to a non-distribution peer 610. The managed server 140 may also notify non-peer client devices 605 that additional layers are available to distribution peers. Thus, by making additional layers 310-15 available only to distribution peers, the hosting device 620 provides an incentive for requesting devices to share in the distribution and storage cost of the additional layers 310-15.

In terms of storage, layers of layered media, whether base, enhancement or combinations thereof, may be stored separately or together on one or more peers and/or distribution peers in P2P networks and/or in managed servers and/or distributed managed servers, and/or in combinations thereof. Criteria may be used by a server, by a client, a peer, or by another device, such as a network service provider 120, to delete or retain or to direct the deletion or retention of one or more layers. Criteria which may be used to preferentially retain or delete a layer or layers may include one or more of the following (or combinations thereof): a passage of time, a local, regional, or network storage space threshold, the expiration of a time limit or a limit on the number of renderings associated with a layer or layers, a rendering quality of the layer, a rendering ability of the peer or peers with which a peer exchanges data, a terminal condition of a peer or client, demand for a particular content instance and/or a layer thereof, availability of a particular content instance and/or a layer thereof (as may be measured by absolute availability, by access latency, or by other measures of availability within a P2P network), the memory required to store a layer, the processing required to render a layer, whether the layer is capable of being independently rendered, whether the layer is an enhancement layer, a priority level associated with the layer, assignment or reassignment of a file and/or memory address associated with a layer or data associated with a layer, and/or whether license fees or other fees or costs are associated with retention of the layer (whether owed by the peer, by a provider of the content instance, or by another party).

In an alternate embodiment, hosting device 620 may also distribute additional layers 310-15 to non-peer client devices that have obtained a premium status by, for example, purchasing a subscription, having acted as a distribution peer in the past, or having performed some other desired act.

In one exemplary embodiment, one or more layer of layered media can be stored on one or more devices or servers connected to the P2P network 130. For example, the managed server 140 can store the base layer of a given piece of media, the secondary layer of the given piece of media can be stored on the first peer device 110A, and the tertiary layer of the given piece of media can be stored on the second peer device 110B. The user device can download or stream the base layer from the hosting device 620, and also stream or download the secondary and/or tertiary layer from the first peer device 110A and second peer device 110B respectively, if the user desires to have higher fidelity for the given piece of media. Prior to or following distribution by the managed server 140, one or more of the layers may be encrypted and/or encoded according to a Digital Rights Management ("DRM") scheme, with a decryption key or other access technology being provided by, with and/or as a layer, as discussed above.

Alternatively, the base level of a given piece of media can be stored on one or more peer device 110A-B and subsequent layers of the given piece of media (secondary, tertiary, etc.) can be stored on the hosting device 620.

In yet another exemplary embodiment the hosting device 620 can be used to "seed" peer devices 610-415 with layers of layered media and selectively provide layers of layered media to peers 610-15 participating in the P2P network 130. For example, the hosting device 620 can initially provide many layers 305-15 of a media stream 300 to peers 610-15 participating in the P2P network 130. Once a sufficient number of peers 610-15 participating in the P2P network 130 have collectively received the plurality of media layers of a media stream 300, the managed server 140 can cease providing one or more layers 310-15 of the media stream, can provide limited access to one or more layers 310-15 of the media stream, or can reduce the transfer rate limit for one or more layers 310-15 of the media stream 300. In another embodiment, the hosting device 620 can be absent, or the hosting device 620, when queried by a peer 610-15 participating in the P2P network 130, can disguise itself as a peer device instead of a managed hosting device 620. In a still further embodiment the P2P network 130 can be a centralized, decentralized, structured, unstructured, or hybrid P2P network, or the like.

In a still further embodiment, a network service provider 630, such as a DNS server, a proxy server, a P2P indexing or seeding server, a special-purpose packet sniffing or another network service component performs certain functions, such as measuring demand on the hosting device 620 and, either acting on its own or under the direction of the hosting device 620, to direct requests from the hosting device 620 to the P2P network 130.

Figure 7:
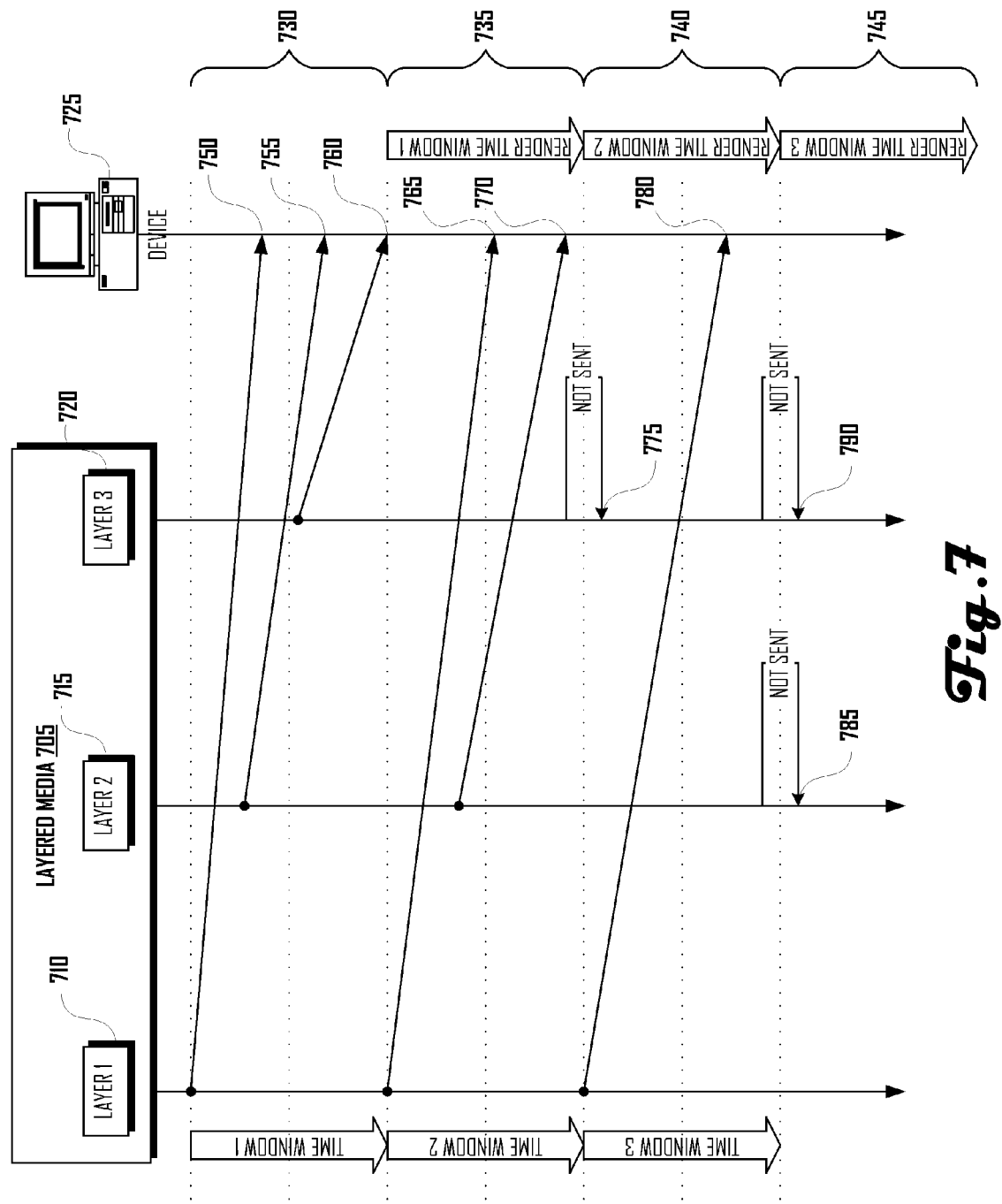
FIG. 7 is a pictorial diagram illustrating adaptive distribution of layered media in accordance with various embodiments.

FIG. 7 is a diagram illustrating the general concept of adaptive distribution of layered media in accordance with various embodiments. A hosting device hosts a layered media stream 705 comprising in this illustrative example three layers of decreasing priority: layer 1 710 (base layer, highest priority), layer 2 715, and layer 3 720 (lowest priority). A playback device 725 is adaptively receiving the layered media stream 705. In the illustration, the vertical axis represents time, and is divided into a series of time windows 730-45. The hosting device transmits the base layer, arriving at time 750. In the exemplary embodiment, the hosting device waits for the device 725 to acknowledge receipt before transmitting the next highest priority layer, which arrives at time 755. The client acknowledges receipt of layer 2 in a timely fashion, so the hosting device transmits layer 3 720 from the first time window, which arrives at time 760. At the beginning of the second time window 735, the device 725 may begin playback of the information it has received, although in many embodiments, the device may buffer more than the first time window before it begins playback. The hosting device transmits the base layer and second layer of time window 2, but in the illustrated example, network congestion has increased and layer 2 does not arrive 770 until nearly the end of the second time window. As layer 3 720 cannot be received in a timely fashion, the hosting device does not send layer 3 of time window 2 775. In the illustrated example, network congestion has further impeded delivery of layers from time window 3, and only the base later is received 780 in time to be rendered in a timely manner. Accordingly, layers 2 and 3 from time window 3 are not sent 785-90. In the illustrative example, the playback device would experience no interruptions as it rendered time windows 1-3, despite the increasing network congestion, although the quality of the rendering may have diminished, as fewer enhancement layers were received in later time windows.

Client acknowledgment and not sending layers was used in the foregoing as an example; as discussed below, in alternative embodiments, transmission delay, data loss, and/or other undesirable network and/or communication conditions may be detected, estimated, and/or measured through other means, such as by an allowed time between packets as measured by the client or by a server load threshold or network condition measured by a network service provider 630. In addition, all layers may sent, regardless of acknowledgment or other indicator of network conditions.

Figure 8:
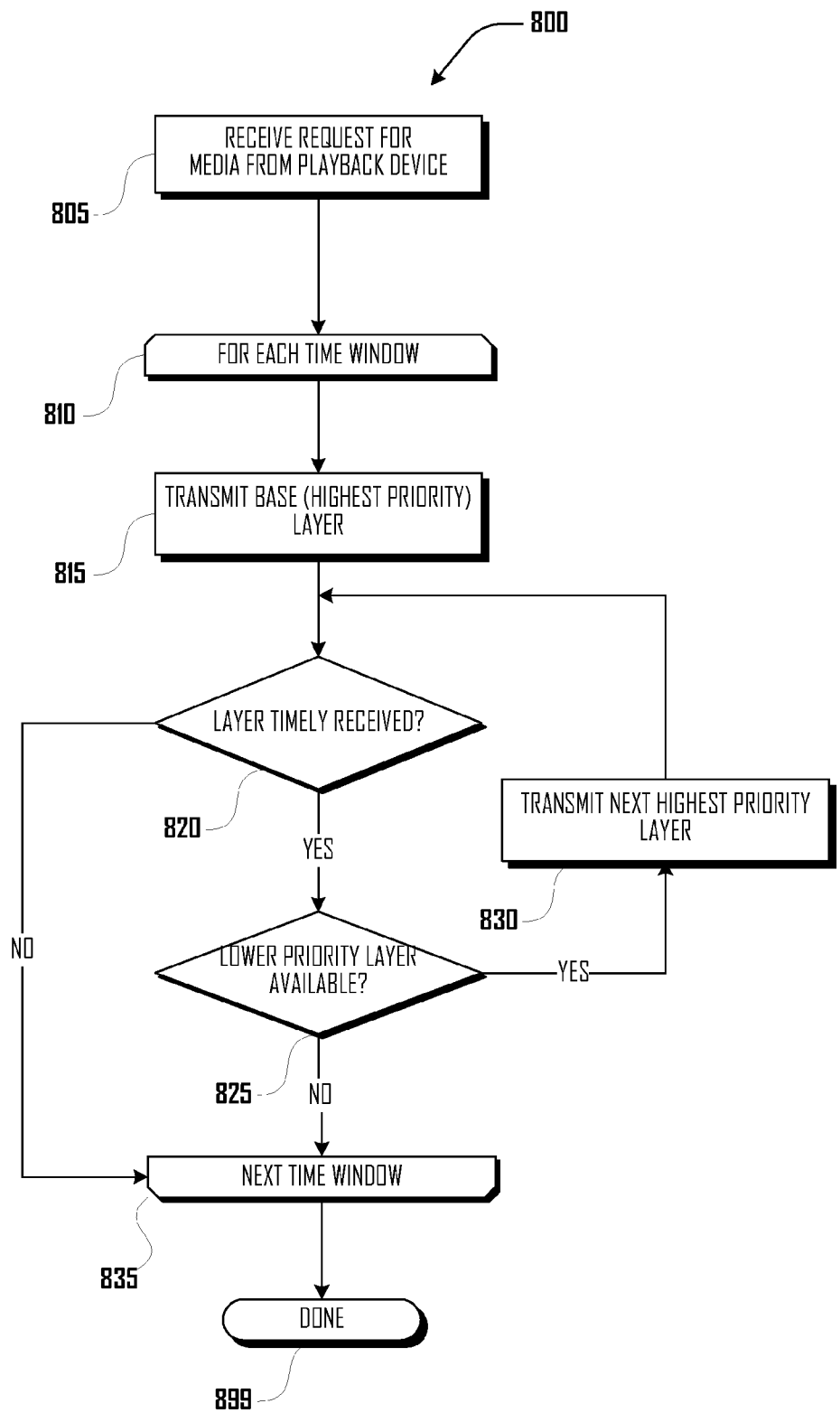
FIG. 8 is a flow diagram illustrating staggered adaptive distribution of layered media in accordance with various embodiments.

FIG. 8 is a flow diagram illustrating a routine 800 for staggered adaptive distribution of layered media in accordance with various embodiments. The routine may be executed on a hosting device (which, in some embodiments, may also be a playback and/or client device). At block 805, the hosting device receives a request for a layered media stream from a playback device. In looping block 810, the hosting device iterates over all available time windows starting with the first time window requested by the playback device. Those of ordinary skill in the art will recognize that it is common to stream media on a time-windowed basis. As used herein, a "time window" of a layer of a set of media information layers refers to a portion of time-based media information that is to be rendered within a certain time window, relative to the rest of the stream of time-based media information. "Time window" is not used to refer to a deadline by which a portion of media information must be received. As discussed below, "timely receipt" of a time-windowed portion of a set of layers of media information does not necessarily depend on receipt by a certain deadline. In various embodiments, the width of the time window may be set in accordance with any number of performance and other considerations.

For the current time window, at block 815, the routine 800 transmits the highest priority layer, also referred to as the base layer. At decision block 820, the routine 800 determines whether the current layer was received in a timely fashion by the playback device. Routine 800 may make this determination in accordance with any of several well-known methods. For example, the hosting device may rely on an acknowledgement message sent by the playback device. In one embodiment, the hosting device may receive an ACK from the playback device, with which it may be communicating using the Transport Control Protocol ("TCP"). In other embodiments, and as discussed elsewhere, transmission delay, data loss, and/or other undesirable network and/or communication conditions may be detected, estimated, and/or measured through other means, such as by an allowed time between packets as measured by the client or a network service provider 120. Whether a time-windowed portion of a layer or set of layers is timely received may depend on factors such as the size and/or amount of data in a rendering buffer or on other factors. Accordingly, in some circumstances, a time-windowed portion of a set of layers may be considered to be timely received even if it takes longer than real-time to transmit.

If the current layer was not timely received in decision block 820, the routine proceeds to block 835, which loops back to block 810 if there are additional time windows available. If there are no more time windows, there is no more media information to transmit, and the routine ends 899. If there is a subsequent time window available, the routine returns to block 815, where the base layer of the next time window is transmitted.

If the hosting device determines at decision block 820 that the current layer was timely received, in decision block 825, the routine 800 determines whether there are additional lower priority layers available for the current time window. If not, the routine proceeds to block 835, which loops back to block 810 if there are additional time windows available. If there are additional lower priority layers available for the current time window, routine 800 transmits the next highest priority layer in block 830, and the routine returns to decision block 820.

In one embodiment, the routine 800 may use a congestion control protocol to determine whether to transmit additional layers. For example, routine 800 may use RFC 3448, TCP Friendly Rate Control ("TFRC"), or RFC 2581, TCP Congestion Control, as maintained by the Internet Engineering Task Force ("IETF"), which is herein incorporated by reference. RFC 2581 TCP's four intertwined congestion control algorithms: slow start, congestion avoidance, fast retransmit, and fast recovery. Such congestion control protocols are well-known in the art, and one of ordinary skill therein would appreciate how to use them to control the amount of outstanding data being injected into a network. By using such congestion control protocols, the need to engage in complex and inaccurate bandwidth estimations is greatly reduced.

Figure 9:
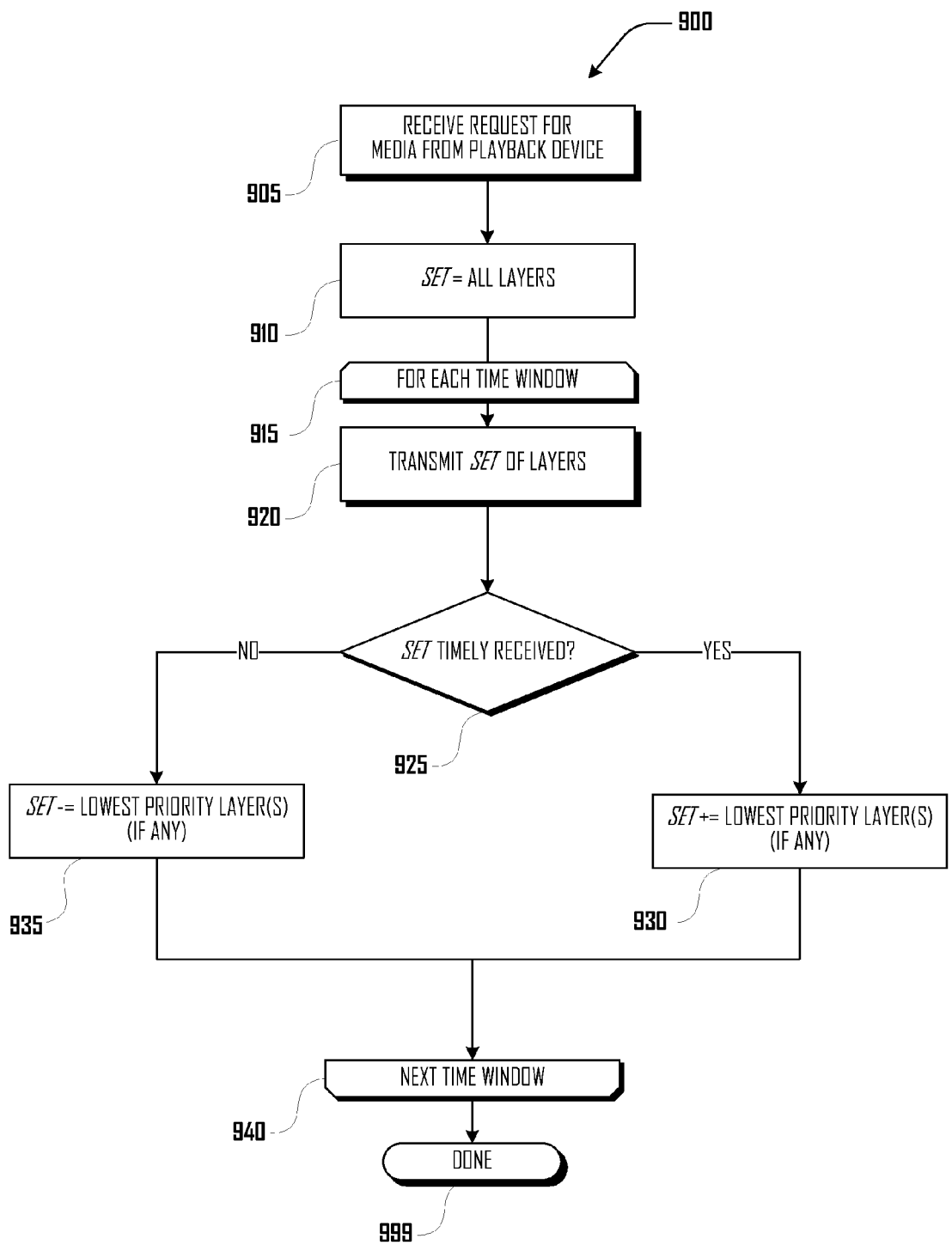
FIG. 9 is a flow diagram illustrating chunked adaptive distribution of layered media in accordance with various embodiments.

FIG. 9 is a flow diagram illustrating a routine 900 for chunked adaptive distribution of layered media in accordance with various embodiments. The routine may be executed on a hosting device. At block 905, the hosting device receives a request for a layered media stream from a playback device. In assignment block 910, a set of layers is initialized, typically to include all available layers. In alternate embodiments, the set may be initialized to fewer than all available layers. In looping block 915, the hosting device iterates over all available time windows starting with the first time window requested by the playback device. For the current time window, at block 920, the routine 900 attempts to transmit the entire set of layers. At decision block 920, the routine 900 determines whether the current set of layers was received in a timely fashion by the playback device. The routine 900 may make this determination as discussed above. If the current set of layers was received in a timely manner, the routine proceeds to assignment block 930, where one or more additional lower-priority layers (if there are any available) are appended to the set, and the routine loops back to block 915, where the newly appended set of layers for the next time window is transmitted. If the current set of layers was not received in a timely manner, the routine proceeds from decision block 925 to assignment block 935, where one or more remaining lower-priority (non-base) layers (if there are any available) are removed from the set, and the routine loops back, at block 940, to block 915, where the new set of layers for the next time window is transmitted. Once no more time windows remain, the routine ends 999.

Figure 10:
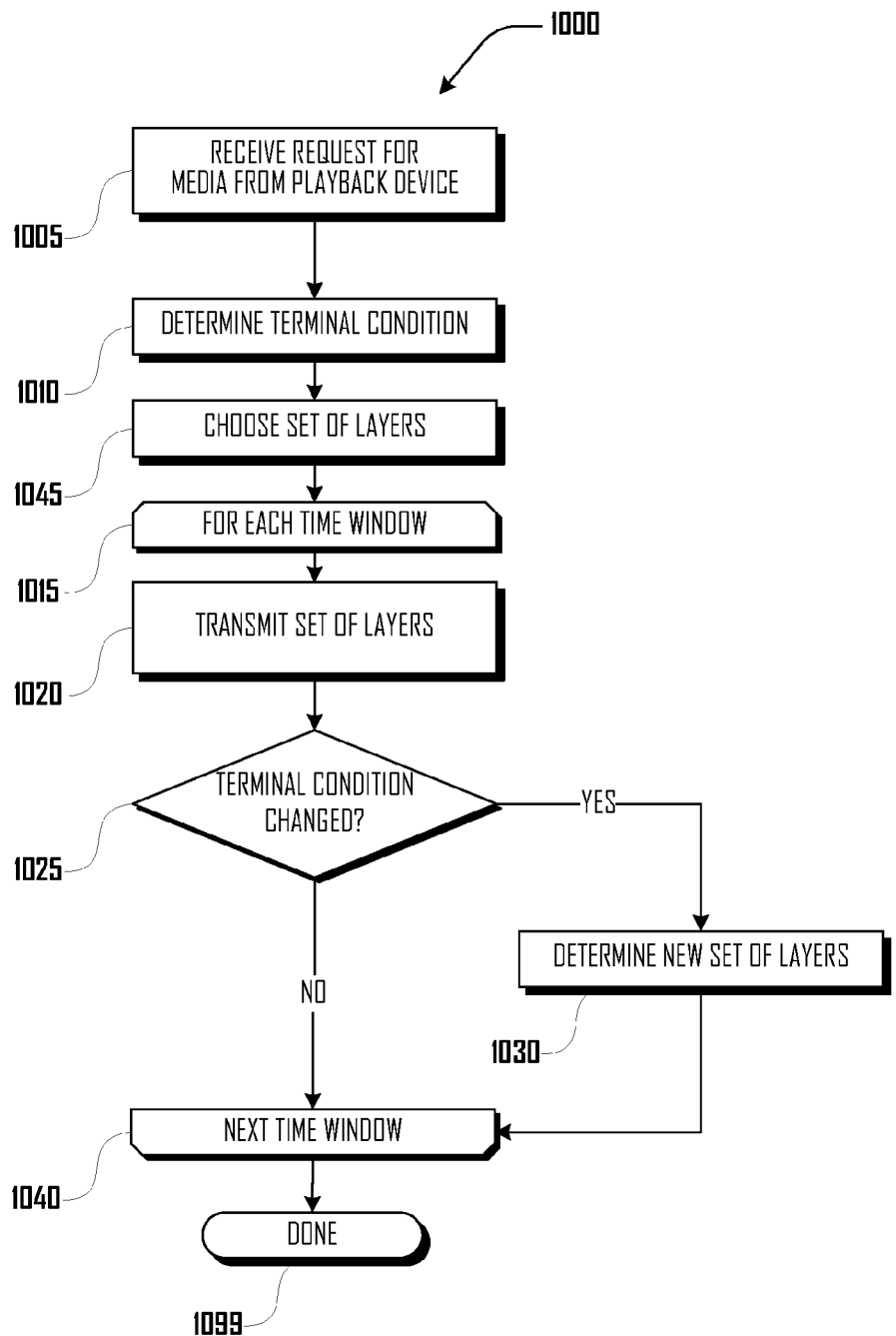
FIG. 10 is a flow diagram illustrating distribution of layered media that adapts to changing terminal conditions in accordance with various embodiments.

FIG. 10 is a flow diagram illustrating a routine 1000 for distributing layered media that adapts to changing terminal conditions in accordance with various embodiments. The routine may be executed on a hosting device. At block 1005, the hosting device receives a request for a layered media stream from a playback device. In block 1010, one or more initial terminal conditions is determined, referring to a condition related to receipt and/or rendering of the media stream on the rendering device. For example, the routine 1000 may determine that the media stream is to be rendered at a particular resolution or size. For another example, the routine 1000 may determine that the rendering device is capable of rendering media in a particular format. As an illustrative use case, a mobile media player or phone may request a media stream from a hosting device. Routine 1000 may determine that the mobile device will render the content at a resolution of 320× 180 pixels, at a size of 2.5 inches, and/or that the mobile device supports video encoded with a low-complexity H.264 scalable baseline profile and stereo audio up to 160 kbs. In various embodiments, other determinable terminal conditions are also applicable. For example, it may be determined that the mobile device is connected to a network having more or less bandwidth (e.g., a "3G" cellular data network or a "2G" cellular data network), or that other conditions on the mobile device (e.g., processor capacity, power consumption, or memory availability) are above or below a threshold.

In block 1045, routine 1000 chooses a set of layers in accordance with one or more of the determined terminal conditions. For example, in the illustrative use case, the initial set of layers may comprise only the base layer. In looping block 1015, the hosting device iterates over all available time windows starting with the first time window requested by the playback device. For the current time window, at block 1020, the routine 1000 attempts to transmit the current set of layers. At decision block 1020, routine 1000 determines whether a terminal condition has changed. If no terminal conditions have changed, the routine loops back to block 1015, where the current set of layers for the next time window is transmitted. If a terminal condition has changed, routine 1000 proceeds to block 1030, where a new set of layers is chosen in accord with the changed terminal condition. For example, in the illustrative use case, the mobile device's user may have moved onto a different data network and/or the user may have "docked" the mobile device onto a docking device, a host computer, or the like. The docked mobile device may be able to render the media stream at a higher resolution, at a larger size, with a higher encoding profile, and/or to more channels of audio. Accordingly, routine 1000 may determine that the rendering device can now take advantage of one or more enhancement (lower priority) layers. One or more of such enhancement layers may then be added to the set that will be transmitted for the next time window, in block 1040, the routine loops back to block 1015. In alternate embodiments, a rendering device may also change from having greater rendering capacity to having a lower rendering capacity, such as if a docked mobile device is removed from a docking device. In other embodiments, a terminal condition may change for reasons unrelated to an increase or decrease in the device's capabilities. For example, a user may simply resize a playback window, changing the size and/or resolution at which a media stream may be rendered. Routine 1000 may add or remove layers from the transmit set upon determining that the rendering window has been resized. Once no more time windows remain, the routine ends 1099.

Although FIG. 10 illustrated a routine 1000 for distributing layered media that adapts to changing terminal conditions, a client or rendering device may use a similar routine for obtaining layered media that adapts to changing terminal conditions. From a client's perspective, the adaptive receiving routine 1000 would request media from a hosting device at block 1005 (not receive a request for media), and the adaptive receiving routine would request (not transmit) a set of layers at block 1020. The remaining steps would be similar to those described.

From a client or rendering device's 200 perspective, there are many other ways that layered media can be adaptively obtained. For example, a client may staggers requests for layers, starting with higher priority (base) layer first. The client may have numerous options depending on whether it is able to obtain requested layers in a timely manner (e.g., soon enough that the media may be rendered without interruption):
- request next highest priority enhancement layer only if base layer is timely received;
- request further next highest priority enhancement layer only if next highest priority enhancement layer is timely received
- if base layer not timely received, then request enhancement layer from additional/other peers and/or servers;
- if base layer not timely received, then request highest priority layer for next time window from additional/other peers and/or servers.

A client may also request a set of higher priority layers from multiple peers/servers/other hosting devices, but request lower priority layers from fewer peers/servers/other hosting devices.

In another set of embodiments, a client or rendering device 200 may request all layers once (in chronologically ordered time windows), then act in some or all of the following manners:
- if base layer is timely received, then request next time window;
- if highest priority layer is not timely received, then do not request at least one lower priority layer for next time window;
- if base layer not timely received, then request missing base layer from additional/other peers/servers/other hosting devices;
- if base layer not timely received, then request next time window from additional/other peers/servers/other hosting devices;
- if base layer not timely received, then request highest priority layer for next time window from additional/other peers/servers/other hosting devices;
- if base layer not timely received, then request next lower priority layer from additional/other peers/servers/other hosting devices.

Figure 11:
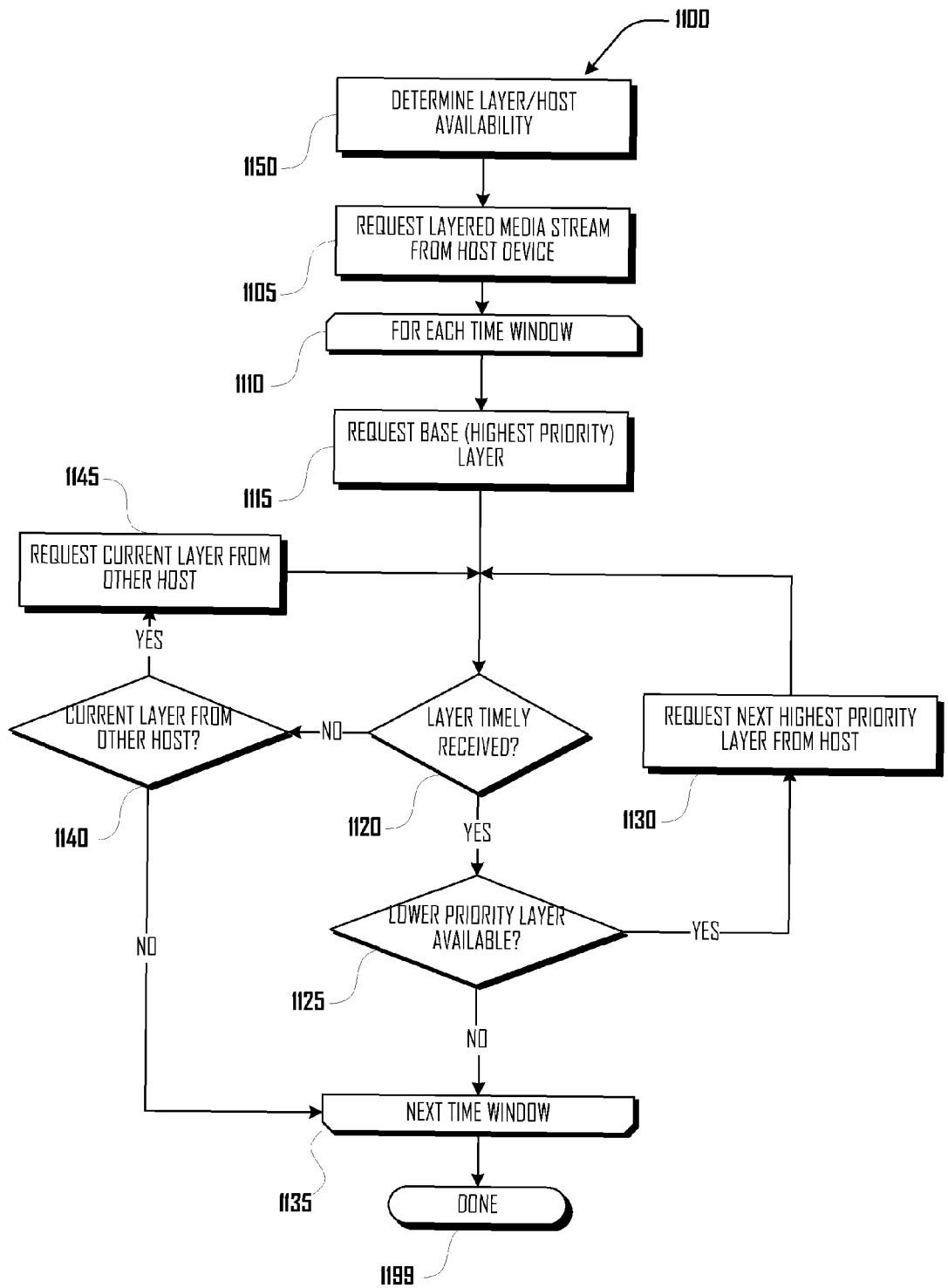
FIGS. 11-14 are flow diagrams illustrating routines a rendering device can use to adaptively obtain layers of layered media in accordance with various embodiments.

Several exemplary client or rendering device 200 embodiments are illustrated in FIGS. 11-14. FIG. 11 is a flow diagram illustrating a routine 1100 a rendering device can use to adaptively obtain layers of layered media in accordance with various embodiments. At block 1150, routine 1100 determines what layers are available for the desired media stream and determines a set of hosts from which various layers may be obtained. In various embodiments, a hosting device may be a managed server, a distribution peer, a managed server acting as a distribution peer, or the like. The rendering device may determine host/layer availability by querying a registry, a managed server, a peer, a P2P network, or the like. Moreover, the rendering device may consult previously obtained information about host/layer availability. In various embodiments, this information may be periodically updated. At block 1105, the rendering device requests a layered media stream from one or more hosting devices. In looping block 1110, the rendering device iterates over all available time windows starting with the first time window it wishes to receive. For the current time window, at block 1115, the routine 1100 requests the highest priority layer, also referred to as the base layer. At decision block 1120, the routine 1100 determines whether the current layer was received in a timely fashion. If so, in decision block 1125, the routine 1100 determines whether there are additional lower priority layers available for the current time window. If not, the routine proceeds to block 1135, which loops back to block 1110 if there are additional time windows. If there are additional lower priority layers for the current time window, routine 1100 requests the next highest priority layer in block 1130, and the routine returns to decision block 1120.

If in decision block 1120, the current layer was not received in a timely fashion, the routine proceeds to decision block 1140, in which the rendering device determines whether the current (not timely received) layer is available from another host. If the current layer is not available from another host, the routine proceeds to loop to the next time window. If the current layer is available from another host, in block 1145, the routine 1100 may request the current layer from the other host and processing returns to decision block 1120. In one embodiment, the routine may thereafter request the layer in question from the other host, if the rendering device is able to obtain the layer in question from the other host in a timely fashion.

Figure 12:
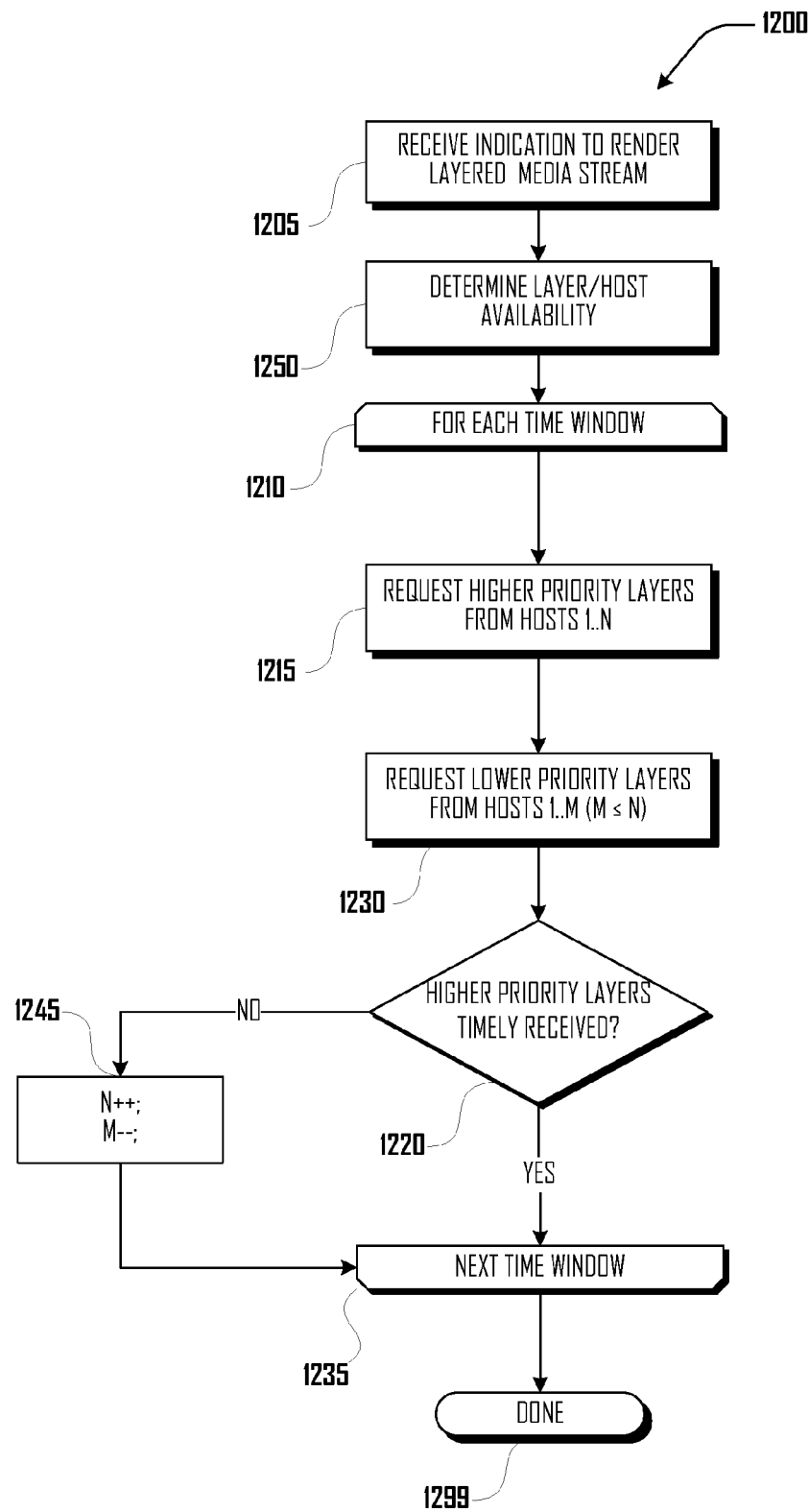

FIG. 12 is a flow diagram illustrating a routine 1200 that a rendering device can use to adaptively obtain layers of layered media in accordance with various embodiments. At block 1205, the rendering device receives an indication to render a layered media stream that is available from one or more hosting devices. At block 1250, routine 1200 determines what layers are available for the desired media stream and determines a set of hosts from which various layers may be obtained. In various embodiments, this information may be periodically updated. In looping block 1210, the rendering device iterates over all available time windows starting with the first time window it wishes to receive. For the current time window, at block 1215, the routine 1200 requests a set of higher priority layers, including the base layer and zero or more higher priority enhancement layers. The set of higher priority layers is requested simultaneously from a group of N hosts. In block 1230, routine 1200 requests one or more lower priority enhancement layers from a second (smaller) group of M hosts, wherein M is less than or equal to N. There may be overlap between the group of N hosts and the group of M hosts.

At decision block 1220, the routine 1200 determines whether the higher priority layers were received in a timely fashion. If so, the routine 1200 proceeds to loop back to process the next time window. In an alternate embodiment, the routine 1200 waits until the beginning of the next time window before looping back, in block 1235, to process the next time window from block 2310. If the higher priority layers were not received in a timely fashion, the routine proceeds to assignment block 1245, in which N is incremented and M is decremented so that higher priority layers will be requested from more hosts, and lower priority layers will be requested from fewer hosts when routine 1200 loops back, in block 1235, to process the next time window at block 1210.

Figure 13:
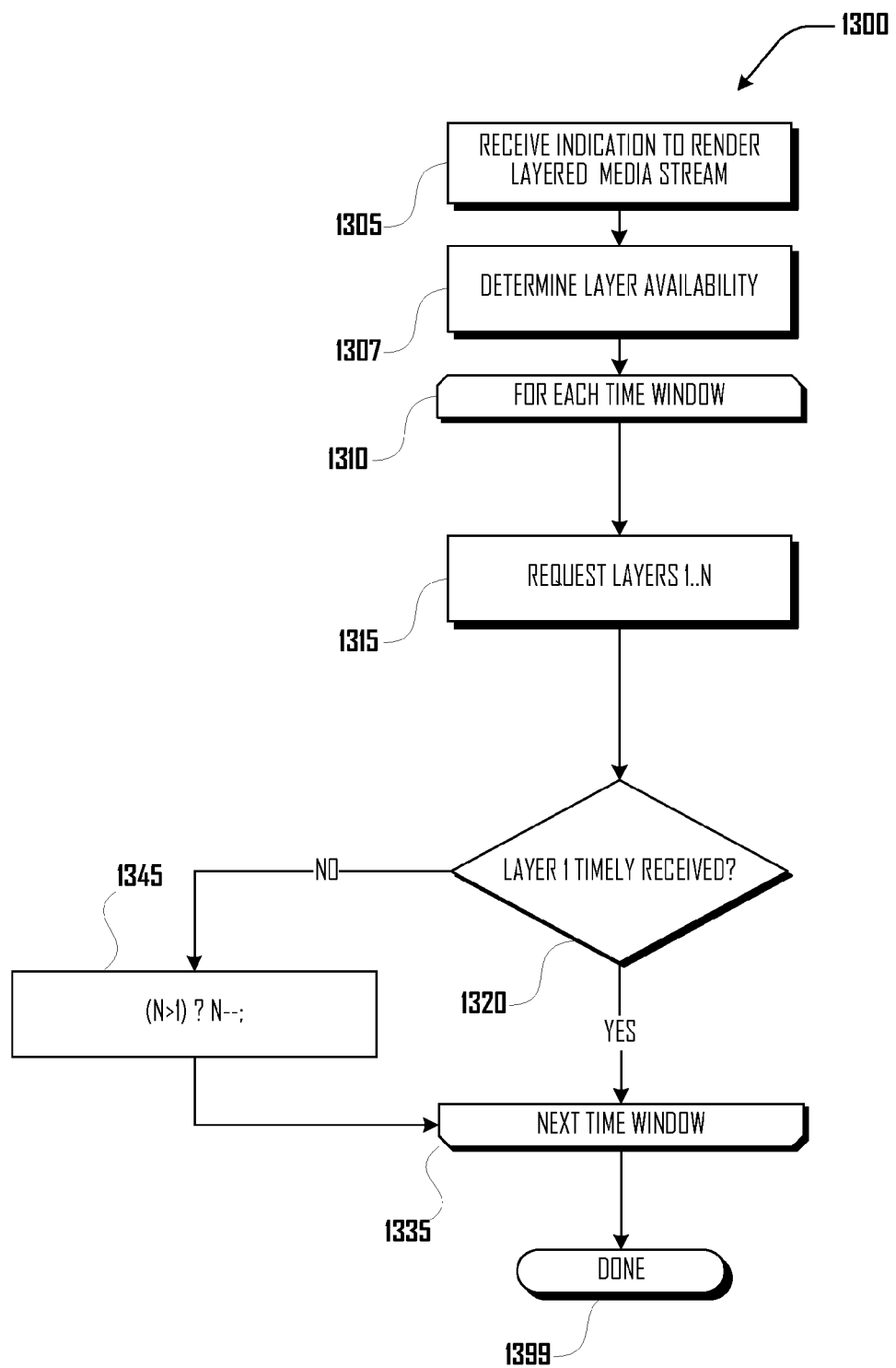

FIG. 13 is a flow diagram illustrating a routine 1300 that a rendering device can use to adaptively obtain layers of layered media in accordance with various embodiments. At block 1305, the rendering device receives an indication to render a layered media stream that is available from one or more hosting devices. At block 1307, routine 1300 determines what layers are available for the desired media stream. In alternate embodiments, this information may be periodically updated. From looping blocks 1310 to 1335, the routine 1300 iterates over all available time windows starting with the first time window the device wishes to receive. For the current time window, at block 1315, the routine 1300 requests a set of higher priority layers, including the base layer and zero or more higher priority enhancement layers (layer 1 to layer N).

At decision block 1320, the routine 1300 determines whether the base layer was received in a timely fashion. If so, the routine 1300 proceeds to loop back, in block 1335, to process the next time window from block 1310. In an alternate embodiment, the routine 1300 waits until the beginning of the next time window before looping back, in block 1335, to process the next time window from block 1310. If the base layer was not received in a timely fashion, the routine proceeds to assignment block 1345, in which N is decremented if it is greater than 1 (if N is 1, it is left unchanged), so that fewer lower priority layers will be requested when routine 1300 loops back, in block 1335, to process the next time window from block 1310. Once all time windows have been processed, the routine 1330 ends at block 1399.

Figure 14:
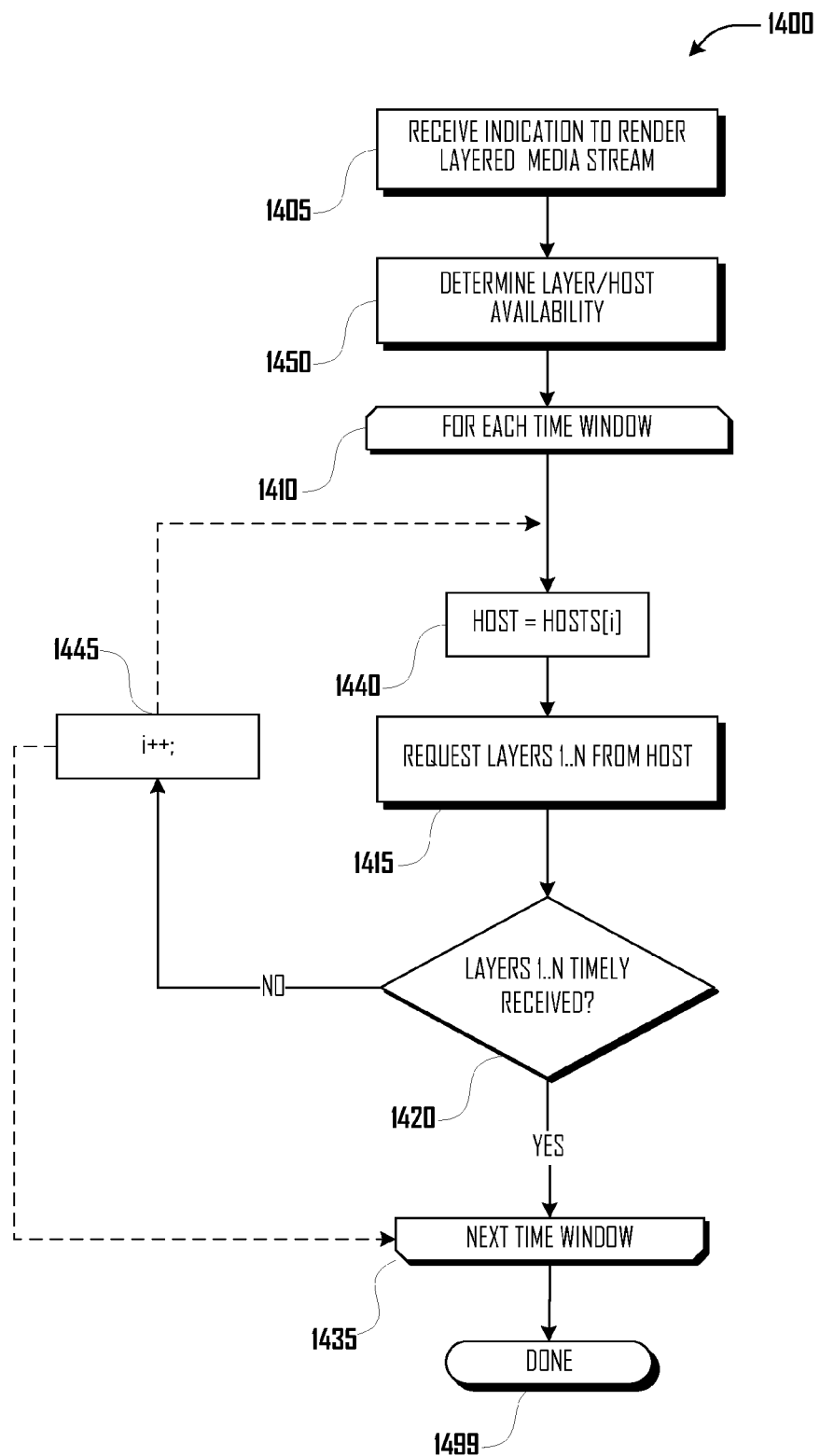

FIG. 14 is a flow diagram illustrating a routine 1400 that a rendering device can use to adaptively obtain layers of layered media in accordance with various embodiments. At block 1405, the rendering device receives an indication to render a layered media stream that is available from one or more hosting devices. At block 1450, routine 1400 determines what layers are available for the desired media stream and determines a list of hosts (which may be distribution peers, servers, or a combination thereof) from which various layers may be obtained. In various embodiments, this information may be periodically updated. From looping blocks 1410 to 1435, the routine 1400 iterates over all available time windows starting with the first time window the device wishes to receive. In assignment block, a host (represented as "Hosts [i]") is chosen from the list of hosts having the desired set of layers, 1-N. In various embodiments, the host may be selected according to any number of factors, including proximity, current load, or the like. For the current time window, at block 1415, the routine 1400 requests a set of layers, 1-N, including the base layer and zero or more higher priority enhancement layers. The set of higher priority layers is requested from the selected host.

At decision block 1420, routine 1400 determines whether layers 1-N were received in a timely fashion. If so, the routine 1400 proceeds to loop back to process the next time window. If not, the routine proceeds to assignment block 1445, in which N is incremented so that layers 1-N will be requested from an alternate host. In one embodiment, routine 1400 may then proceed back to blocks 1440 and 1445, in which layers 1-N for the current time window are requested from the new host. In another embodiment, routine 1400 proceeds from assignment block 1445 to 1435 and loops back to request layers 1-N of the next time window from the new host.

In various embodiments, a rendering device executing a routine illustrated in FIGS. 11-14 may store received time windowed layer information in a playback or rendering buffer. In various embodiments of such rendering devices, when a time window expires (or is about to expire), all layers obtained until that point may be combined and rendered. Data from partially-available layers may be used during the combination process. If the base layer is missing, the client may have to re-buffer. In various embodiments, when data for an earlier time window is received during a later time window, the data from the earlier time window is untimely and may be ignored.

Figure 15:
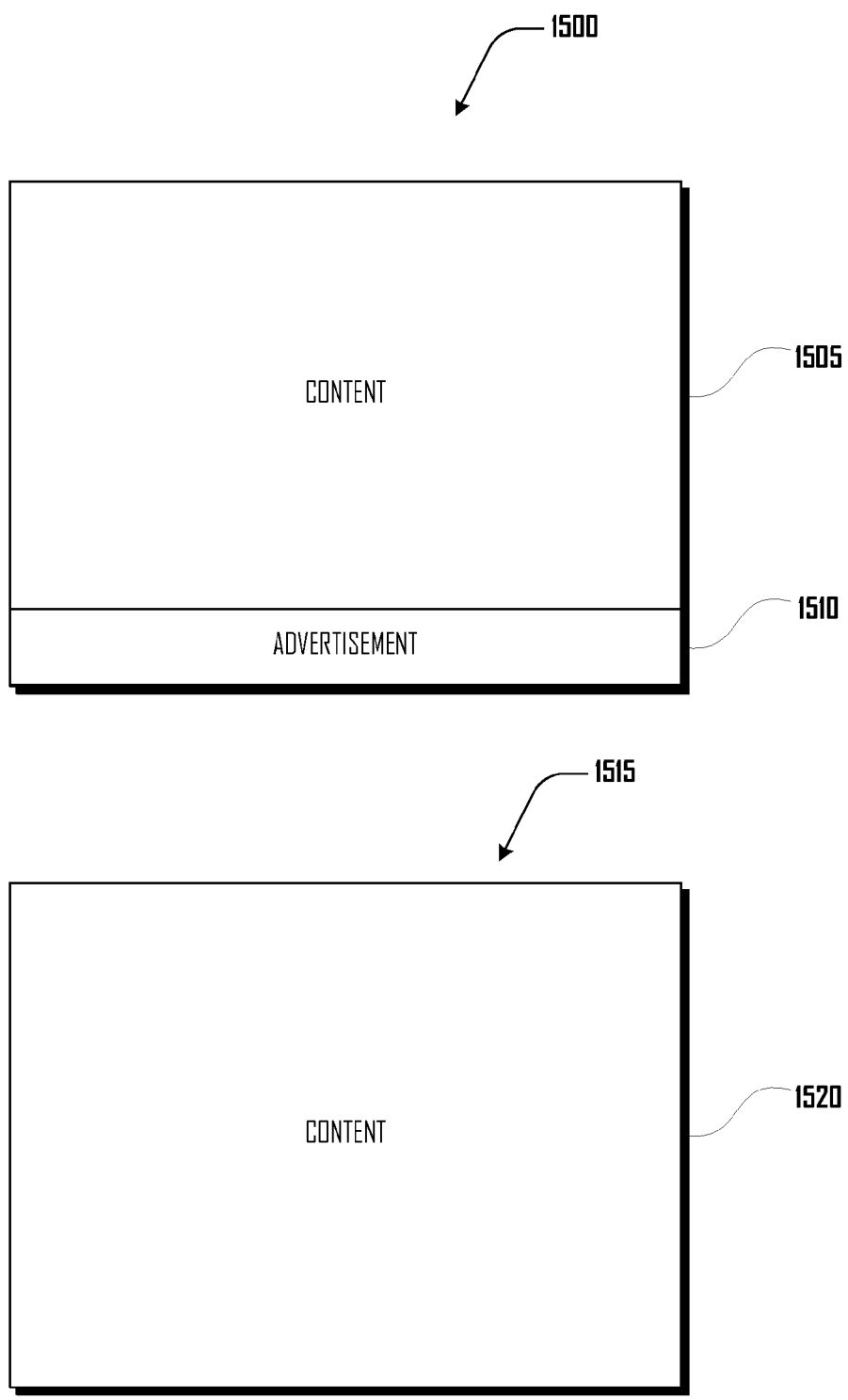
FIG. 15 is a pictorial diagram of an enhancement layer removing an advertisement in a base layer in accordance with various embodiments.

In one exemplary embodiment, illustrated in FIG. 15, the base layer 1505 may render to a display 1500 including media content 1505 and one or more pieces of advertising content 1510 overlaid on or replacing parts of the content 1505. A subsequent layer may enhance the base layer by removing, obscuring, resizing, replacing, and/or altering the advertisement. For example, a subsequent layer may render to a display 1515 with only content 1520 and no advertising.

This embodiment is intended to depict an exemplary embodiment only, and in other embodiments, other types of layered or variable fidelity media may be used.

Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. This application is intended to cover any adaptations or variations of the embodiment discussed herein. Therefore, it is manifested and intended that the invention be limited only by the claims and the equivalents thereof. While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined by reference to the claims that follow.

The invention claimed is:

1. A computer-implemented method of obtaining via a network a layered media stream, the method comprising:
   hosting an encoded media content stream comprising a plurality of media information layers of different priorities, including at least one highest-priority layer, wherein:
      said plurality of layers comprise substantially non-redundant media information;
      each of at least one lower-priority layers may be decoded into a media content stream in combination with at least one higher-priority layer; and
      the decoded media content stream improves as more layers are combined;
   obtaining a first time window of a first set of said plurality of media information layers in accordance with a client terminal condition;
   determining a change in said client terminal condition;
   obtaining a second time window of a second set of said plurality of media information layers in accordance with the changed client terminal condition;
   rendering said first time window; and
   rendering said second time window.

2. The method of claim 1, wherein said client terminal condition comprises at least one of a rendering resolution, a rendering size, a media rendering capability, a processor load, a power consumption, and a memory capacity.

3. The method of claim 2, wherein said change in said client terminal condition comprises an increase in said rendering resolution and said second set comprises media information layers that can be decoded to a higher resolution than said first set.

4. The method of claim 2, wherein said change in said client terminal condition comprises a decrease in said rendering resolution and said second set comprises media information layers that can be decoded to a lower resolution than said first set.

5. A non-transient computer-readable storage medium having stored thereon instructions that when executed by a processor, configure the processor to perform a method of obtaining via a network a layered media stream, the method comprising:

hosting an encoded media content stream comprising a plurality of media information layers of different priorities, including at least one highest-priority layer, wherein:

said plurality of layers comprise substantially non-redundant media information;

each of at least one lower-priority layers may be decoded into a media content stream in combination with at least one higher-priority layer; and the decoded media content stream improves as more layers are combined;

obtaining a first time window of a first set of said plurality of media information layers in accordance with a client terminal condition;

determining a change in said client terminal condition;

obtaining a second time window of a second set of said plurality of media information layers in accordance with the changed client terminal condition;

rendering said first time window; and rendering said second time window.

6. The storage medium of claim 5, wherein said client terminal condition comprises at least one of a rendering resolution, a rendering size, a media rendering capability, a processor load, a power consumption, and a memory capacity.

7. The storage medium of claim 6, wherein said change in said client terminal condition comprises an increase in said rendering resolution and said second set comprises media information layers that can be decoded to a higher resolution than said first set.

8. The storage medium of claim 6, wherein said change in said client terminal condition comprises a decrease in said rendering resolution and said second set comprises media information layers that can be decoded to a lower resolution than said first set.

9. A computing apparatus comprising a processor and a memory having stored thereon instructions that when executed by the processor, configure the apparatus to perform a method of obtaining via a network a layered media stream, the method comprising:

hosting an encoded media content stream comprising a plurality of media information layers of different priorities, including at least one highest-priority layer, wherein:

said plurality of layers comprise substantially non-redundant media information;

each of at least one lower-priority layers may be decoded into a media content stream in combination with at least one higher-priority layer; and the decoded media content stream improves as more layers are combined;

obtaining a first time window of a first set of said plurality of media information layers in accordance with a client terminal condition;

determining a change in said client terminal condition;

obtaining a second time window of a second set of said plurality of media information layers in accordance with the changed client terminal condition;

rendering said first time window; and rendering said second time window.

10. The apparatus of claim 9, wherein said client terminal condition comprises at least one of a rendering resolution, a rendering size, a media rendering capability, a processor load, a power consumption, and a memory capacity.

11. The apparatus of claim 10, wherein said change in said client terminal condition comprises an increase in said rendering resolution and said second set comprises media information layers that can be decoded to a higher resolution than said first set.

12. The apparatus of claim 10, wherein said change in said client terminal condition comprises a decrease in said rendering resolution and said second set comprises media information layers that can be decoded to a lower resolution than said first set.

\* \* \* \* \*